(12) United States Patent
Kim et al.

(10) Patent No.: US 12,017,315 B2
(45) Date of Patent: Jun. 25, 2024

(54) MACHINING DEVICE FOR CONTROLLING TOOL POSITION CONSIDERING TOOL WEAR AND METHOD FOR CONTROLLING TOOL POSITION USING THE SAME

(71) Applicant: KOREA INSTITUTE OF INDUSTRIAL TECHNOLOGY, Cheonan-si (KR)

(72) Inventors: Tae Gon Kim, Seongnam-si (KR); Hyo Young Kim, Anseong-si (KR); Seok Woo Lee, Seongnam-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 479 days.

(21) Appl. No.: 17/295,430

(22) PCT Filed: Nov. 18, 2019

(86) PCT No.: PCT/KR2019/015743
§ 371 (c)(1),
(2) Date: May 19, 2021

(87) PCT Pub. No.: WO2020/105984
PCT Pub. Date: May 28, 2020

(65) Prior Publication Data
US 2021/0402542 A1 Dec. 30, 2021

(30) Foreign Application Priority Data

Nov. 20, 2018 (KR) ........................ 10-2018-0143647

(51) Int. Cl.
*B23Q 15/16* (2006.01)
*B23Q 15/12* (2006.01)
(Continued)

(52) U.S. Cl.
CPC ............. *B23Q 15/16* (2013.01); *B23Q 15/12* (2013.01); *B23Q 17/0961* (2013.01);
(Continued)

(58) Field of Classification Search
CPC .... B23Q 15/16; B23Q 15/12; B23Q 17/0961; B23Q 17/0985; B23Q 17/2471;
(Continued)

(56) References Cited

U.S. PATENT DOCUMENTS 4,723,219 A * 2/1988 Beyer ................ G05B 19/4067
700/190
5,393,177 A * 2/1995 Cook ................ B23B 29/03457
408/13
(Continued)

FOREIGN PATENT DOCUMENTS

| JP | 2010073846 A | 4/2010 |
|---|---|---|
| JP | 2010079471 A | 4/2010 |

(Continued)

*Primary Examiner* — Alicia M. Choi
(74) *Attorney, Agent, or Firm* — Rabin & Berdo, P.C.

(57) ABSTRACT

A machining device can lengthen the lifespan of a tool and improve the machining quality of a workpiece by managing the amount of wear of the tool by machining the workpiece using the other portion of the tool when a portion of the tool is worn and the machining performance of the tool is decreased. The machining device includes: a tool-moving unit coupled to a machining unit to change the position of the tool with respect to the workpiece; a supporting unit supporting the workpiece; a sensor unit disposed at the machining unit and measuring a current amount supplied to a machining motor operating the tool, or an operation force of the tool; and a control unit receiving a measurement signal from the sensor unit and transmitting a control signal to the tool-moving unit and the supporting unit.

15 Claims, 3 Drawing Sheets

(51) Int. Cl.
    *B23Q 17/09*     (2006.01)
    *B23Q 17/24*     (2006.01)

(52) U.S. Cl.
    CPC ..... *B23Q 17/0985* (2013.01); *B23Q 17/2471* (2013.01); *B23Q 2717/00* (2013.01)

(58) Field of Classification Search
    CPC ............ B23Q 2717/00; G05B 19/4163; G05B 2219/37258; G05B 2219/49109; G05B 19/404; G05B 19/4065
    See application file for complete search history.

(56) References Cited

U.S. PATENT DOCUMENTS

| | | | |
|---|---|---|---|
| 2007/0016325 A1 | 1/2007 | Esterling | |
| 2009/0028656 A1* | 1/2009 | Forker | B28D 7/005 409/80 |
| 2010/0212964 A1* | 8/2010 | Beuershausen | E21B 10/62 175/57 |
| 2012/0143371 A1* | 6/2012 | Selnes | G05B 19/423 700/254 |
| 2013/0189043 A1* | 7/2013 | Uchiuzo | B23Q 15/12 408/1 R |
| 2016/0332273 A1* | 11/2016 | Furuya | B23Q 17/0966 |
| 2018/0126567 A1* | 5/2018 | Morimura | B23Q 17/09 |
| 2018/0161952 A1* | 6/2018 | Gu | B24B 27/0038 |
| 2018/0290216 A1* | 10/2018 | Park | B23B 29/03485 |
| 2019/0357418 A1* | 11/2019 | Steinlage | A01B 63/32 |
| 2020/0108481 A1* | 4/2020 | Matsuo | B23Q 11/0046 |
| 2021/0283734 A1* | 9/2021 | Angerhofer | B23Q 1/28 |

FOREIGN PATENT DOCUMENTS

| | | | | |
|---|---|---|---|---|
| JP | 2010188431 A | * | 9/2010 | |
| JP | 2015223690 A | * | 12/2015 | |
| JP | 2016132067 A | * | 7/2016 | |
| JP | 2016132067 A | | 7/2016 | |
| JP | 2016215359 A | * | 12/2016 | ........... B23Q 15/013 |
| KR | 19960003211 B1 | | 3/1996 | |
| KR | 101668765 B1 | | 10/2016 | |

* cited by examiner

MACHINING DEVICE FOR CONTROLLING TOOL POSITION CONSIDERING TOOL WEAR AND METHOD FOR CONTROLLING TOOL POSITION USING THE SAME

TECHNICAL FIELD

The present invention relates to a machining device for controlling a tool position considering tool wear and a method for controlling tool position using the same. More particularly, the present invention relates to a machining system that can lengthen the lifespan of a tool and improve the machining quality of a workpiece by managing the amount of wear of the tool by machining the workpiece using the other portion of the tool when a portion of the tool is worn and the machining performance of the tool is decreased.

BACKGROUND ART

Recently, machining systems that automatically perform machining are used in various ways and the use frequency thereof is continuously increasing due to factory automation at industrial sites. Further, such machining systems are being developed to be able to perform various processes such as not only an assembly process for assembling a plurality of parts, but also machining, grinding, painting, etc. of workpieces.

In cutting process of those processes, it is important to control a system that automatically measures the degree of wear of a tool and performs the cutting process in accordance with the degree of wear of the tool. However, a cutting process is performed while the degree of wear of a tool is checked by a photographing device or visually in the related art, so there is a problem of an increase of defective proportion of workpieces.

A method of monitoring a tool wear N.C. cutting system is disclosed in Korean Patent No. 1996-0003211. The method automatically measures wear of a tool from an image by moving a common robot arm to an appropriate position by controlling both of an N.C. controller and a robot controller when a process is finished and then the next process is started during machining or after a workpiece completely finishes being machined, by installing a camera at the end of the robot arm that installs a workpiece and a jig or carries a completed workpiece to a conveyer belt or an unmanned automatic transport vehicle in order to put a C.C.D camera, which is used to monitor weal of a tool, at an appropriate position in a cutting process by an NC lathe or a milling machine.

CITATION LIST

Patent Literature

[Patent Literature 1]
Korean Patent No. 1996-0003211

SUMMARY OF INVENTION

Technical Problem

In order to achieve the problems described above, an object of the present invention is to manage the amount of wear of a tool.

Another object of the present invention is to perform a process while automatically controlling a machining unit such that machining load on the machining unit decreases when the machining load on the machining unit increases.

The objectives to implement in the present invention are not limited to the technical problems described above and other objects that are not stated herein will be clearly understood by those skilled in the art from the following specifications.

Solution to Problem

In order to achieve the object of the present invention, a machining device for controlling a tool position considering tool wear which machines a workpiece using a tool disposed at a machining unit includes: a tool-moving unit coupled to the machining unit and moving the machining unit to change the position of the tool with respect to the workpiece; a supporting unit supporting the workpiece and moving the workpiece to change the position of the workpiece with respect to the tool; a sensor unit disposed at the machining unit and measuring a current amount, which is supplied to a machining motor operating the tool, or an operation force of the tool; and a control unit receiving a measurement signal from the sensor unit and transmitting a control signal to the tool-moving unit and the supporting unit, in which the control unit controls the tool-moving unit or the supporting unit such that a contact portion of the tool that comes in contact with the workpiece is changed when a machining load value of the machining unit exceeds a reference machining load value.

In an embodiment of the present invention, the sensor unit may measure the distance between an end of the tool-moving unit coupled to the machining unit and the workpiece.

In an embodiment of the present invention, the control unit may control the tool-moving unit or the supporting unit such that a relative moving speed of the machining unit and the workpiece is decreased when the machining load value of the machining unit exceeds the reference machining load value.

In an embodiment of the present invention, the machining unit may perform drilling, milling, routing, or grinding on the workpiece.

In an embodiment of the present invention, the control unit may derive the machining load value of the machining unit using the current amount that is supplied to the machining motor.

In an embodiment of the present invention, the control unit may include: a position calculator storing 3D shape data of the workpiece and calculating relative positions of the tool and the workpiece; and an operation controller controlling operation of the tool-moving unit and operation of the supporting unit in accordance with a position value of the tool or a position value of the workpiece derived by the position calculator.

In an embodiment of the present invention, the machining device may further include a photographing unit coupled to the machining unit and obtaining an image of the workpiece.

In an embodiment of the present invention, the machining device may further include a dust removal unit coupled to the machining unit and removing dust on the surface of the workpiece.

In an embodiment of the present invention, the supporting unit may include: a jig supporting the workpiece while in contact with the workpiece and adjusting the position angle of the workpiece with respect to the tool; and a jig actuator coupled to the jig and moving and tilting the jig.

In an embodiment of the present invention, the machining unit may include a temperature measurer that measures the temperature of the surface of the workpiece that comes in contact with the tool.

In an embodiment of the present invention, the machining device may further include a wear amount measurer that measures the amount of wear of the tool.

In order to achieve the objects of the present invention, a method of controlling the machining device includes: i) a step in which the sensor unit measures the current amount that is supplied to the machining motor and measures the distance between the end of the tool-moving unit and the workpiece; ii) a step in which the control unit receives a measurement signal from the sensor unit; iii) a step in which the control unit derives the machining load value of the machining unit using the current amount that is supplied to the machining motor and compares the machining load value of the machining unit with the reference machining load value; iv) a step in which when the machining load value of the machining unit exceeds the reference machining load value, the control unit transmits a control signal to the tool-moving unit or the supporting unit; and v) a step in which the position of the machining unit is changed with respect to the workpiece by controlling the operation of the tool-moving unit or the supporting unit.

In an embodiment of the present invention, in the step v), the tool-moving unit and the supporting unit may move relative to each other.

Advantageous Effects of Invention

According to this configuration of the present invention, there is an effect that it is possible to lengthen the lifespan of a tool and improve the machining quality of a workpiece by managing the amount of wear of the tool by machining the workpiece using the other portion of the tool when a portion of the tool is worn and the machining performance of the tool is decreased.

Further, there is an effect that since the movement speed of the machining unit is controlled such that the machining load value of the machining unit is maintained to be equal to or less than the reference machining load value, it is possible to reduce defective proportion of workpieces and improve stability of the tool.

The effects of the present invention are not limited thereto and it should be understood that the effects include all effects that can be inferred from the configuration of the present invention described in the following specification or claims.

DESCRIPTION OF EMBODIMENTS

A machining device for controlling a tool position considering tool wear which machines a workpiece using a tool disposed at a machining unit of the present invention includes: a tool-moving unit coupled to the machining unit and moving the machining unit to change the position of the tool with respect to the workpiece; a supporting unit supporting the workpiece and moving the workpiece to change the position of the workpiece with respect to the tool; a sensor unit disposed at the machining unit and measuring a current amount, which is supplied to a machining motor operating the tool, or an operation force of the tool; and a control unit receiving a measurement signal from the sensor unit and transmitting a control signal to the tool-moving unit and the supporting unit, in which the control unit controls the tool-moving unit or the supporting unit such that a contact portion of the tool that comes in contact with the workpiece is changed when a machining load value of the machining unit exceeds a reference machining load value.

EMBODIMENTS

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

The terminology used herein is for the purpose of describing particular embodiments only and is not intended to limit the present invention Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Hereinafter, the present invention is described in detail with reference to the accompanying drawings.

Figure 1:
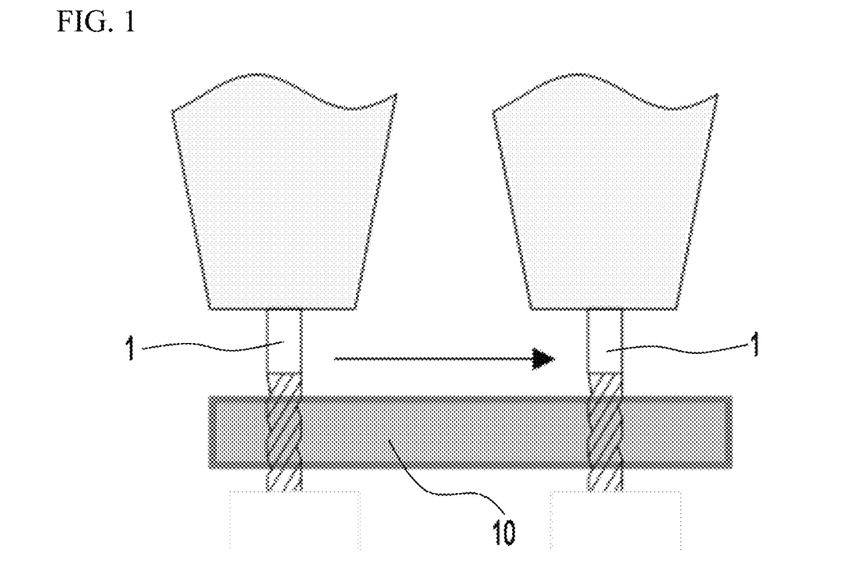
FIG. 1 is a schematic view showing a tool control technique according to the related art.

FIG. 1 is a schematic view showing a tool control technique according to the related art. As shown in FIG. 1, when a tool control technique according to the related art is used, when a workpiece 10 is machined, a portion of a tool 1 is mainly used and the use frequency of the other portion is low, so there may be a problem that wear is concentrated on the portion of the tool 1 and the lifespan of the tool 1 decreases.

Figure 2:
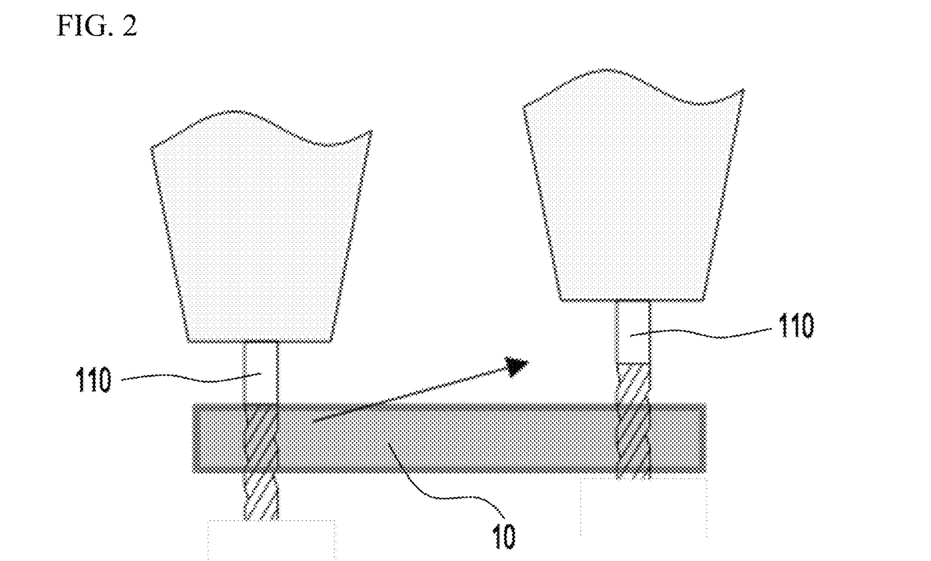
FIG. 2 is a schematic view showing tool control of a machining system according to an embodiment of the present invention.
Figure 3:
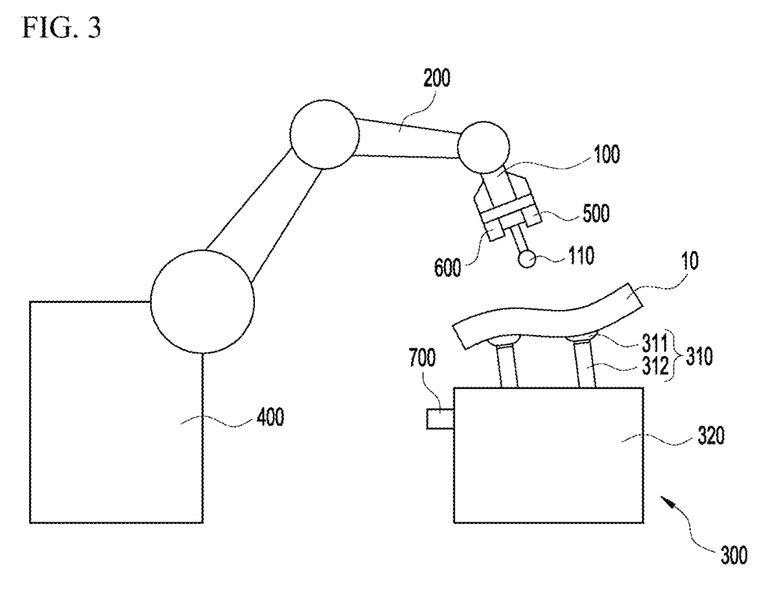
FIG. 3 is a diagram of a machining system according to an embodiment of the present invention.
Figure 4:
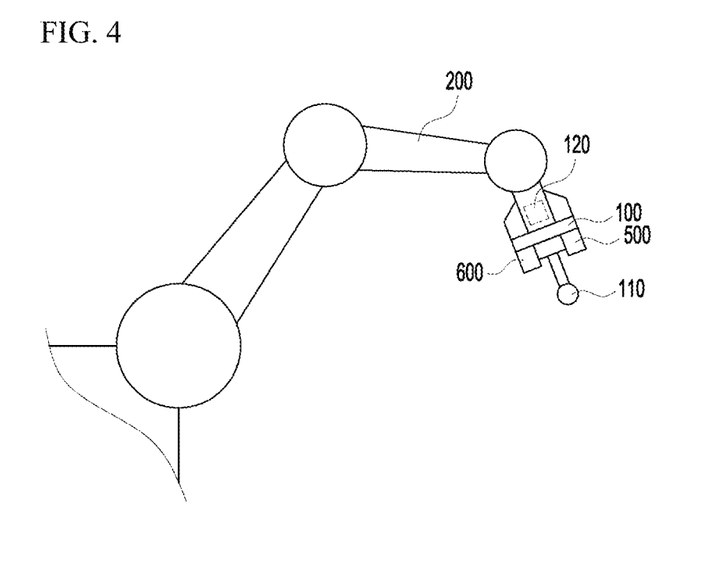
FIG. 4 is a diagram of a tool-moving unit according to an embodiment of the present invention.
Figure 5:
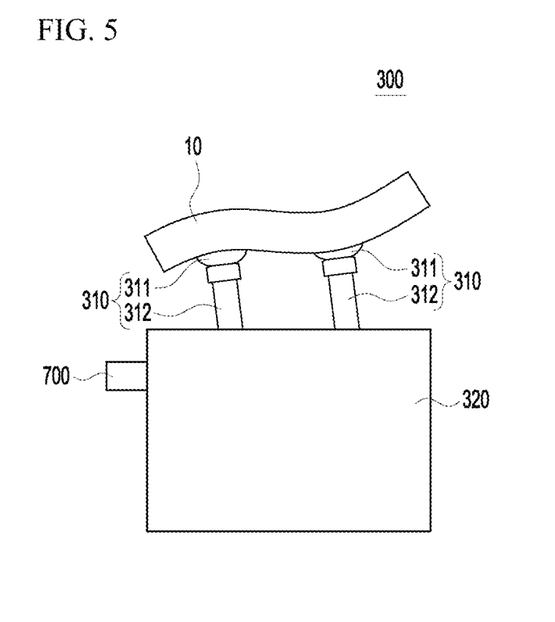
FIG. 5 is a diagram of a supporting unit according to an embodiment of the present invention.

FIG. 2 is a schematic view showing tool control of a machining system according to an embodiment of the present invention, FIG. 3 is a diagram of a machining system according to an embodiment of the present invention, and FIG. 4 is a diagram of a tool-moving unit 200 according to an embodiment of the present invention. FIG. 5 is a diagram of a supporting unit 300 according to an embodiment of the present invention.

As shown in FIGS. 2 to 5, a machining device of the present invention, which is a machining system that machines a workpiece 10 using a tool 110 provided at a machining unit 100, includes: a tool-moving unit 200 coupled to the machining unit 100 and moving the machining unit 100 to change the position of the tool 110 with respect to the workpiece 10; a supporting unit 300 supporting the workpiece 10 and moving the workpiece 10 to change the position of the workpiece 10 with respect to the tool 110; a sensor unit 120 disposed at the machining unit 100 and measuring a current amount, which is supplied to a machining motor operating the tool 110, or the operation force of the tool 110; and a control unit 400 receiving a measurement signal from the sensor unit 120 and transmitting a control signal to the tool-moving unit 200 and the supporting unit 300.

The control unit can control the tool-moving unit 200 or the supporting unit 300 such that the contact portion of the tool 110 that comes in contact with the workpiece 10 is changed when a machining load value of the machining unit 100 exceeds a reference machining load value. The control unit can control the tool-moving unit 200 or the supporting unit 300 such that the relative moving speed of the machining unit 100 and the workpiece 10 is decreased when the machining load value of the machining unit 100 exceeds the reference machining load value.

The machining unit 100 can be moved up, down, left, and right by the tool-moving unit 200 and can be tilted in all directions. (Tilting may mean tilting in all directions in a 3D coordinate system in an embodiment of the present invention). The tool-moving unit 200 may be a robot having a plurality of joints.

The machining unit 100 can perform drilling, milling, routing, or grinding on the workpiece 10. The tool 110 can come in contact with the workpiece 10 in a predetermined area of the surface of the workpiece 10 and the machining unit 100 rotates or straightly reciprocates the tool 110, whereby machining processes such as drilling, milling, routing, or grinding can be performed.

As a machining process is performed by the tool 110, the tool 110 is worn. When a machining process is performed by a worn tool 110, it may be possible to increase the contact force between the tool 110 and the workpiece 10 or increase the number of times of motion per unit time of the tool 110 in order to achieve the same effect as when a machining process is performed on the workpiece 10 by a tool 110 that is not worn.

When the contact force between the tool 110 and the workpiece 10 is increased, the friction between the tool 110 and the workpiece 10 is increased, so the machining load value of the tool 110 may be increased and the current amount that is supplied to the machining motor may also be increased.

When the number of times of motion per unit time of the tool 110 is increased, the number of revolutions (rpm) of the machining motor may be increased and the current amount that is supplied to the machining motor may also be increased.

As described above, since the current amount that is supplied to the machining motor that operates the tool 110 is increased when the machining load is increased, it is possible to derive the machining load value of the tool 110 by measuring the current amount that is supplied to the machining motor.

The sensor unit 120 can measure the distance between the end of the tool-moving unit 200 coupled to the machining unit 100 and the workpiece 10. To this end, the sensor unit 120 may include a distance sensor that measures the distance between the end of the tool-moving unit 200 and the workpiece 10. Further, the sensor unit 120 may include a current amount measurement sensor, which is a sensor for measuring the current amount that is supplied to the machining motor, and a force measurement sensor that is a sensor for measuring the operation force of the tool 110.

The force measurement sensor can measure the force of rotation or the force or straight reciprocation of the tool 110 and can measure the force of rotation or the force or straight reciprocation of the tool 110. When the value of the operation force of the tool 110 is increased, the machining load of the machining unit 100 may be increased.

That is, it is possible to derive a machining load value using the value of the current amount that is supplied to the machining motor or the value of the operation force of the tool 110 and it is possible to determine the average value of both machining load values as the machining load value of the machining unit 100.

Accordingly, it is possible to improve accuracy of the machining load value of the machining unit 100. However, the present invention is not limited thereto and it is possible to derive the machining load value of the machining unit 100 using only the value of the current amount that is supplied to the machining motor or it is possible to derive the machining load value of the machining unit 100 using only the operation force of the tool 110.

The relationship between the value of the current amount that is supplied to the machining motor and the machining load value of the machining unit 100 or the relationship between the operation force of the tool 110 and the machining load value of the machining unit 100 may be obtained through tests and the data may be stored in the control unit 400.

Accordingly, the control unit 400 can derive the machining load value of the machining unit 100 using the current amount that is supplied to the machining motor.

The reference machining load value may be stored in advance in the control unit 400.

When the machining load value of the machining unit 100 exceeds the reference machining load value, it means that the number of times of motion per unit time of the tool 110 that is operating is larger than the number of times of motion per unit time of the tool 110 that is matched with an existing machining load value. In this case, when a machining process is performed while maintaining the movement speed of the tool 110 before the tool 110 is worn, the workpiece 10 may be damaged.

Similarly, when the machining load value of the machining unit 100 exceeds the reference machining load value, it means that the operation force of the tool 110 that is operating is larger than the operation force of the tool 110 that is matched with an existing machining load value. In this case, when a machining process is performed while maintaining the movement speed of the tool 110 before the tool 110 is worn, the workpiece 10 may be damaged.

Accordingly, when the machining load value of the machining unit 100 exceeds the reference machining load value, the control unit 400 measures the position of a portion of the tool 110 that comes in contact with the workpiece using the distance between the end of the tool-moving unit 200 and the workpiece 10 measured by the distance sensor and transmits a control signal to the tool-moving unit 200, whereby the distance between the end of the tool-moving unit 200 and the workpiece 10 is adjusted. Accordingly, the other portion of the tool 110 that is not the portion of the tool 110 can be used for machining while in contact with the workpiece 10. Accordingly, when the wear amount of a portion of the tool 110 increases and the machining performance of the tool 110 is deteriorated, machining is performed by the other portion of the tool 110, whereby the amount of wear of the tool 110 is managed. Accordingly, the lifespan of the tool 110 is lengthened and the machining quality of the workpiece 10 can also be improved.

Alternatively, when the machining load value of the machining unit 100 exceeds the reference machining load value, safety of the tool-moving unit 200 may decrease and the workpiece 10 may become defective, so the relative moving speed of the machining unit 100 and the workpiece 10 can be decreased.

Adjustment of the position of the tool 110 and adjustment of the moving speed of tool 110 may be simultaneously used in one machining process. In detail, when the machining load value of the machining unit 100 exceeds the reference machining load value, the moving speed of the tool 110 is adjusted first, thereby the machining load value of the machining unit 100 is decreased. Then, the position of the tool 110 is adjusted such that machining is performed with the moving speed of the tool 110 adjusted back to the speed before the moving speed of the tool 110 is adjusted.

The control unit 400 may include a position calculator storing 3D shape data of the workpiece 10 and calculating relative positions of the tool 110 and the workpiece 10, and an operation controller 400 controlling operation of the tool-moving unit 200 and operation of the supporting unit 300 in accordance with the position value of the tool 110 or the position value of the workpiece 10 derived by the position calculator.

The machining unit 100 has a first position sensor, so it can measure the position of the tool 110, and the supporting unit 300 has a second position sensor, so it can measure the position of the workpiece 10. The position calculator receives position information of the tool 110 and position information of the workpiece 10 from the first position sensor and the second position sensor and can calculate the relative positions of the tool 110 and the workpiece 10 using the position information such that the relative positions are suitable for the current process.

The operation control unit 400 receives the calculation value derived by the position calculator and transmits a control signal to the tool-moving unit 200 and the supporting unit 300, thereby being able to control the operation of the tool-moving unit 200 and the supporting unit 300.

As shown in FIGS. 3 and 4, the machining device of the present invention may further include a photographing unit 500 coupled to the machining unit 100 and obtaining an image of the workpiece 10. The photographing unit 500 can transmit an image of the workpiece 10 to the control unit 400, and the control unit 400 can compare the transmitted image of the workpiece 10 with the 3D shape data of the workpiece 10 stored in the position calculator.

As the control unit 400 compares the image of the workpiece 10 with the 3D shape data of the workpiece 10, the control unit can correct the relative positions of the tool 110 and the workpiece 10 by comparing the work region of the surface of the workpiece 10 derived from the 3D shape data of the workpiece 10 with the image of the workpiece 10.

The relative positions of the tool 110 and the workpiece 10 may include not only the relative 3D positions of the tool 110 and the workpiece 10, but the angle made by the central axis of the tool 110 and the normal of the work region of the surface of the workpiece 10.

As shown in FIGS. 3 and 5, the machining device of the present invention may further include a dust removal unit 600 coupled to the machining unit 100 and removing dust on the surface of the workpiece 10. The dust removal unit 600 is coupled to the machining unit 100 in a duct shape and may be connected to a suction hose installed in the tool-moving unit 200 and suctioning air. The suction hose may be connected to a suction pump providing a force for suctioning air.

The dust removal unit 600 connected to the suction hose can suction dust by operation of the suction pump. As the machining unit 100 is moved, the dust removal unit 600 can suction and remove dust on the surface of the workpiece 10 while changing the position.

The supporting unit 300 may have: a jig 310 supporting the workpiece 10 in contact with the workpiece 10 and adjusting the position angle of the workpiece 10 with respect to the tool 110; and a jig actuator 320 coupled to the jig 310 and moving and tilting the jig 310. The position angle may be the angle made by the central axis of the tool 110 and the normal of the work region of the surface of the workpiece 10.

The supporting unit 300 may have a plurality of jigs 310. The jig actuator 320 moves the jig 310 up, down, left, and right, whereby the jig 310 can move the workpiece 10 up, down, left, and right. Alternatively, the jig actuator 320 can tilt the jig 310 in all directions, so the workpiece 10 can be inclined.

The jig 310 may have an adsorber 311 performing vacuum adsorption on a surface of the workpiece 10, rather than on the surface of the workpiece 10 coming in contact with the tool 110, at the end of the jig 310. The jig 310 may have an adsorber support 312 coupled to the adsorber 311 and moving up, down, left, and right.

The adsorber 311 fixes the workpiece 10 through vacuum adsorption and the angle of the adsorber 311 can be adjusted, so the adsorber 311 can easily adsorb a surface, which is a curved surface, of the workpiece 10. The adsorber 311 is made of a flexible material, so the vacuum adsorption force can be increased.

The machining unit 100 may include a temperature measurer that measures the temperature of the surface of the workpiece 10 that comes in contact with the tool 110. The workpiece 10 may be deteriorated or deformed by an increase in temperature, depending on the material of the workpiece 10. Accordingly, the temperature measurer can measure in real time the surface temperature of the workpiece 10, and when the surface temperature of the workpiece 10 measured by the temperature measurer exceeds a reference temperature stored in advance in the control unit 400, the machining load value of the machining unit 100 can be reduced. The temperature measurer may include a non-contact type temperature measurement sensor that measures temperature by radiating an infrared lay to the surface of workpiece 10.

The machining device of the present invention may further include a wear amount measurer 700 that measures the amount of wear of the tool 110. As shown in FIG. 5, the wear amount measurer 700 may be coupled to the supporting unit 300. The tool 110 disposed at the machining unit 100 can be separated from the machining unit 100. The separated tool 110 may be placed on the wear amount measurer 700. The wear amount measurer 700 can measure the weight of the separated tool 110. The wear amount measurer 700 can measure the weight of the tool 110 reduced by wear in the tool 110 that is not worn by comparing the weight of the tool 110 before it is worn with the separated tool 110, and can calculate the amount of wear of the tool 110 using the reduced weight of the tool 110. That is, the weight reduction amount of the tool 110 and the amount of wear of the tool 110 may be proportionate.

A cutting process system including the machining device of the present invention may be constructed. A system for producing a carbon fiber reinforcing plastic (CFRP) product including the machining device of the present invention can be constructed.

Since it is possible to manufacture various shapes of products due to the characteristics of the carbon fiber reinforcing plastic (CFRP) material, products made of the carbon fiber reinforcing plastic (CFRP) material may have complicated shapes. In addition, large products made of the carbon fiber reinforcing plastic (CFRP) material are increasing. Accordingly, when the carbon fiber reinforcing plastic (CFRP) is machined by the machining device of the present invention, the quality of carbon fiber reinforcing plastic (CFRP) products can be improved.

Hereafter, a method of controlling a tool position using the machining device of the present invention is described.

In the first step, the sensor unit 120 can measure the current amount that is supplied to the machining motor and can measure the distance between the end of the tool-moving unit 200 and the workpiece 10.

In the second step, the control unit 400 can receive a measurement signal from the sensor unit 120.

In the third step, the control unit 400 can derive the machining load value of the machining unit 100 using the current amount that is supplied to the machining motor, and can compare the machining load value of the machining unit 100 with the reference machining load value.

In the fourth step, when the machining load value of the machining unit 100 exceeds the reference machining load value, the control unit 400 can transmit a control signal to the tool-moving unit 200 or the supporting unit 300.

In the fifth step, the position of the machining unit 100 can be changed with respect to the workpiece 10 by controlling the operation of the tool-moving unit 200 or the supporting unit 300. In this case, the tool-moving unit 200 and the supporting unit 300 can move relative to each other.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

REFERENCE SIGNS LIST

1: tool
10: workpiece
100: machining unit
110: tool
120: sensor unit
200: tool-moving unit
300: supporting unit
310: jig
311: adsorber
312: adsorber support
320: jig actuator
400: control unit
500: photographing unit
600: dust removal unit
700: wear amount measurer

The invention claimed is:

1. A machining device for controlling a tool position considering tool wear which machines a workpiece using a tool disposed at a machining unit, the machining device comprising:
   a tool-moving unit coupled to the machining unit and moving the machining unit to change the position of the tool with respect to the workpiece;
   a supporting unit supporting the workpiece and moving the workpiece to change a position of the workpiece with respect to the tool;
   a sensor unit disposed at the machining unit and measuring a current amount, which is supplied to a machining motor operating the tool, or an operation force of the tool; and
   a controller receiving a measurement signal corresponding to the current amount from the sensor unit and transmitting a control signal to the tool-moving unit and the supporting unit,
   wherein the controller controls the tool-moving unit or the supporting unit such that a current contact portion of the tool that comes in contact with the workpiece is changed when a machining load value of the machining unit exceeds a reference machining load value, and
   wherein the sensor unit measures a distance between an end of the tool-moving unit coupled to the machining unit and the workpiece, and
   the controller adjusts the distance between the end of the tool-moving unit and the workpiece based on the machining load value exceeding the reference machining load value so that a portion of the tool other than the current contact portion is used to come in contact with the workpiece.

2. The machining device of claim 1, wherein the controller controls the tool-moving unit or the supporting unit such that a relative moving speed of the machining unit and the workpiece is decreased when the machining load value of the machining unit exceeds the reference machining load value.

3. The machining device of claim 1, wherein the machining unit performs drilling, milling, routing, or grinding on the workpiece.

4. The machining device of claim 1, wherein the controller derives the machining load value of the machining unit using the current amount that is supplied to the machining motor.

5. The machining device of claim 1, wherein the controller includes:
   a position calculator storing 3D shape data of the workpiece and calculating relative positions of the tool and the workpiece; and
   an operation controller controlling operation of the tool-moving unit and operation of the supporting unit in accordance with a position value of the tool or a position value of the workpiece derived by the position calculator.

6. The machining device of claim 1, further comprising a camera coupled to the machining unit and obtaining an image of the workpiece.

7. The machining device of claim 1, further comprising a vacuum unit coupled to the machining unit and removing dust on the surface of the workpiece.

8. The machining device of claim 1, wherein the supporting unit includes:

a jig supporting the workpiece while in contact with the workpiece and adjusting the position angle of the workpiece with respect to the tool; and a jig actuator coupled to the jig and moving and tilting the jig.

9. The machining device of claim 1, wherein the machining unit includes a temperature measurement sensor that measures the temperature of the surface of the workpiece that comes in contact with the tool.

10. The machining device of claim 1, further comprising a wear amount measurer that measures the amount of wear of the tool.

11. A cutting process system comprising the machining device for controlling a tool position considering tool wear of claim 1.

12. A system for producing a carbon fiber reinforcing plastic (CFRP) product, the system comprising the machining device for controlling a tool position considering tool wear of claim 1.

13. A method of controlling the machining device for controlling a tool position considering tool wear of claim 1, the method comprising:
 i) a step in which the sensor unit measures the current amount that is supplied to the machining motor and measures the distance between the end of the tool-moving unit and the workpiece;
 ii) a step in which the controller receives the measurement signal from the sensor unit;
 iii) a step in which the controller derives the machining load value of the machining unit using the current amount that is supplied to the machining motor and compares the machining load value of the machining unit with the reference machining load value;
 iv) a step in which when the machining load value of the machining unit exceeds the reference machining load value, the controller transmits the control signal to the tool-moving unit or the supporting unit; and
 v) a step in which the position of the machining unit is changed with respect to the workpiece by controlling the operation of the tool-moving unit or the supporting unit.

14. The method of claim 13, wherein, in the step v), the tool-moving unit and the supporting unit move relative to each other.

15. The machining device of claim 1, wherein the controller adjusts the distance between the end of the tool-moving unit and the workpiece based on the machining load value exceeding the reference machining load value so that the portion of the tool other than the current contact portion is used to come in contact with the workpiece by moving the portion of the tool from outside the workpiece to inside the workpiece.

* * * * *